United States Patent [19]
Olivetti

[11] Patent Number: 5,327,818
[45] Date of Patent: Jul. 12, 1994

[54] APPARATUS FOR PREPARING AND DISTRIBUTING FERMENTED DIARY PRODUCTS

[76] Inventor: Maurizio Olivetti, Via Ugo De Carolis, 101, I-00135 Roma, Italy

[21] Appl. No.: 66,907

[22] Filed: May 24, 1993

[30] Foreign Application Priority Data

May 27, 1992 [IT] Italy .................. RM92 A 000389

[51] Int. Cl.$^5$ .................. A23G 9/00; A47J 27/00; B01F 7/16; B01F 15/06
[52] U.S. Cl. .................................. 99/455; 62/342; 99/453; 99/460; 99/466; 366/144; 366/149; 366/314
[58] Field of Search .............. 99/325, 326, 327, 331, 99/334, 348, 452–455, 460, 461, 464, 466, 483; 366/144–146, 149, 314; 62/342, 343

[56] References Cited
U.S. PATENT DOCUMENTS

| | | | |
|---|---|---|---|
| 3,896,716 | 7/1975 | Carasso | 99/452 |
| 3,946,657 | 3/1976 | Driessen et al. | 99/455 |
| 4,163,472 | 8/1979 | Taylor | 99/453 |
| 4,195,561 | 4/1980 | Castanis | 99/455 |
| 4,255,060 | 3/1981 | Manfroni | 366/149 |
| 4,540,288 | 9/1985 | Pandolfi | 62/342 |
| 4,582,863 | 4/1986 | Pandolfi | 366/314 |
| 4,664,529 | 5/1987 | Cavalli | 99/455 |
| 4,838,702 | 6/1989 | Torimitsu | 62/342 |
| 4,964,333 | 10/1990 | Bravo | 99/483 |
| 5,054,383 | 10/1991 | Cho | 99/327 |

Primary Examiner—Timothy F. Simone
Attorney, Agent, or Firm—Darby & Darby

[57] ABSTRACT

The apparatus comprises a vat having a lateral wall and a bottom for pasteurizing, maturing and maintaining a product. A cover adjacent to the lateral wall and to the bottom controls the temperature of the product present in the vat. A first heat-exchange circuit is defined by the cover and by the vat. A heat-exchange fluid circulates in the first heat-exchange circuit. The first heat-exchange circuit includes a heat generator for the heating of the heat-exchange fluid and includes a first heat exchanger for the cooling of the heat-exchange fluid. A second heat-exchange circuit has a tank. A diathermic liquid circulates in the second heat-exchange circuit. A second heat-exchanger is disposed in the tank, and a refrigeration group is connected, in a heat-exchange relationship, to the second heat-exchanger. The second heat-exchange circuit is connected to the first heat-exchanger by a by-pass conduit parallel to the first heat-exchanger. A first on-off valve is connected to the by-pass conduit and has a second on-off valve connected to an inlet of the first heat-exchanger to selectively control the flow of diathermic liquid passing from the second refrigeration circuit. A cleaning circuit has a cleaning water tub, an inlet, and an outlet communicating respectively with a cleaning water source and a discharge drain. An electronic control system programs and commands the preparation and distribution of the product.

10 Claims, 3 Drawing Sheets

APPARATUS FOR PREPARING AND DISTRIBUTING FERMENTED DIARY PRODUCTS

BACKGROUND OF THE INVENTION

The invention relates to an apparatus for preparing and distributing to the public of fresh fermented dairy products. Among these products the most widely made and sold is yogurt, but the apparatus can also be used to make like products, such as fresh curds, cottage cheese, fresh junket and the like as well as being adaptable for pasteurization of cream and ice cream bases. For the sake of simplicity, in the following description the product referred to will be yogurt.

The apparatus according to the invention is designed to be used and located especially in establishments specialised in the sale of the above fresh products and can be integrated into traditional retail places such as bars, restaurants, ice cream parlours and pastry shops. The apparatus can also be used where there is a distribution of the fresh products as an alternative to packed products, for example in hospitals, hotels, holiday villages, sports centres, supermarkets, health and dietary centres and so on.

One advantage offered by the present invention is that the apparatus eliminates the need for special "laboratories" for the preparation, conservation and distribution of the product and indeed the apparatus can be blended into the establishment's furnishing.

The preparation of yogurt commonly envisages the following phases.

A fortification process causes the evaporation of part of the water contained in the milk in order to render the final product more consistent.

A high-pressure and high-temperature homogenisation phase follows, in order to have a product in which the fats are uniformly distributed to make them more easily digestible.

Then follows a pasteurization phase which has the aim of eliminating any pathogenic microorganisms which might prevent the perfect activation of the enzymes. Pasteurization is performed by heating the milk to 92 degrees C. for several minutes.

A culture phase follows the pasteurization, cooling rapidly down to about 43 degrees C. and mixing about 1 percent of culture into the milk, the culture being formed by *Lactobacillus bulgaricus* and *Streptococco termophilus*.

In the culture maturation phase the product is slowly mixed for some minutes in order to avoid the advent of lumps and keeping the structure unaltered and homogeneous. The temperature is constantly maintained at 43 degrees Celsius for at least 6-7 hours according to the density and the acidity desired for the product.

After the last process, the coagulation is broken up by activating the anchor/stirrer at a low rate of revolutions.

The maintenance phase consists in a rapid cooling to 4-5 degrees Celsius to arrest fermentation. At this point the yogurt is ready to be served and consumed, and can be blended with many and varied ingredients, such as fresh fruit, berries, cereals, coffee and the like, or it can be used as a sauce for other dishes. It is important that the product does not undergo sudden changes in temperature, that it is kept at the most between 43-45 degrees Celsius and at least between 4.5 degrees Celsius so that the live lactic microorganisms do not die.

An essential advantage of the present invention is that the product is served fresh, that is immediately or just a few hours after its has been prepared.

It is a well-known fact that lactic flora decays progressively starting after the final phase of maturation and maintenance, and in order to have a product at its best, this deterioration must be reduced to a minimum.

Differently to industrial yogurts, which from the moment of packing to consumation undergo a large number of temperature changes and time-lapses, to the detriment of both taste and health-giving qualities of the product, the present invention offers a yogurt at its best both in terms of nutrition and at its most depurative.

SUMMARY OF THE INVENTION

An aim of the present invention, therefore is to provide an apparatus for the preparation of fermented dairy products comprising: a vat for pasteurization, maturation and maintenance of the product; a cover adjacent to the lateral wall and at the bottom of the vat for the control of the temperature of the product present in the vat; a first heat-exchange circuit for heating and cooling the product contained in the vat, including the cover, a heat-exchange fluid circulating in the said first circuit, a heat generator to produce a heating of the heat-exchange liquid, a first heat exchanger to cause a cooling of the heat-exchange liquid; a second heat-exchange circuit for refrigeration, including the first heat-exchanger, a second heat-exchanger, a refrigeration group in a heat-exchange relationship with the second heat-exchanger, a tank for the diathermic liquid circulating in the said second refrigeration circuit between the tank and the first and second heat-exchanger, a by-pass conduit parallel to the first heat-exchanger, a first on-off valve on the by-pass conduit and a second on-off valve on the inlet of the first heat-exchanger, so that by opening the first valve and closing the second valve the diathermic liquid is prevented from passing through the first heat-exchanger in order to effect a heating phase on the product in the vat, while by closing the first on-off valve, and opening the second on-off valve, the diathermic liquid passes through the first heat exchanger to remove heat from the heat exchange liquid in the first heat exchanger and to produce a cooling of the product in the vat; a cleaning circuit comprising a cleaning water tub equipped with an inlet and an outlet respectively communicating with a cleaning water source and a discharge drain, a first conduit placing the washing tub in communication with the inside of the vat, and a second conduit connecting a discharge opening of the vat to the tub; and an electronic control system for programmed command of the pasteurisation, maturation, maintenance and cleaning phases.

BRIEF DESCRIPTION OF THE DRAWINGS

The invention will now be described in greater detail, with reference to the accompanying drawings, in which.

DESCRIPTION OF THE PREFERRED EMBODIMENTS

Figure 1:
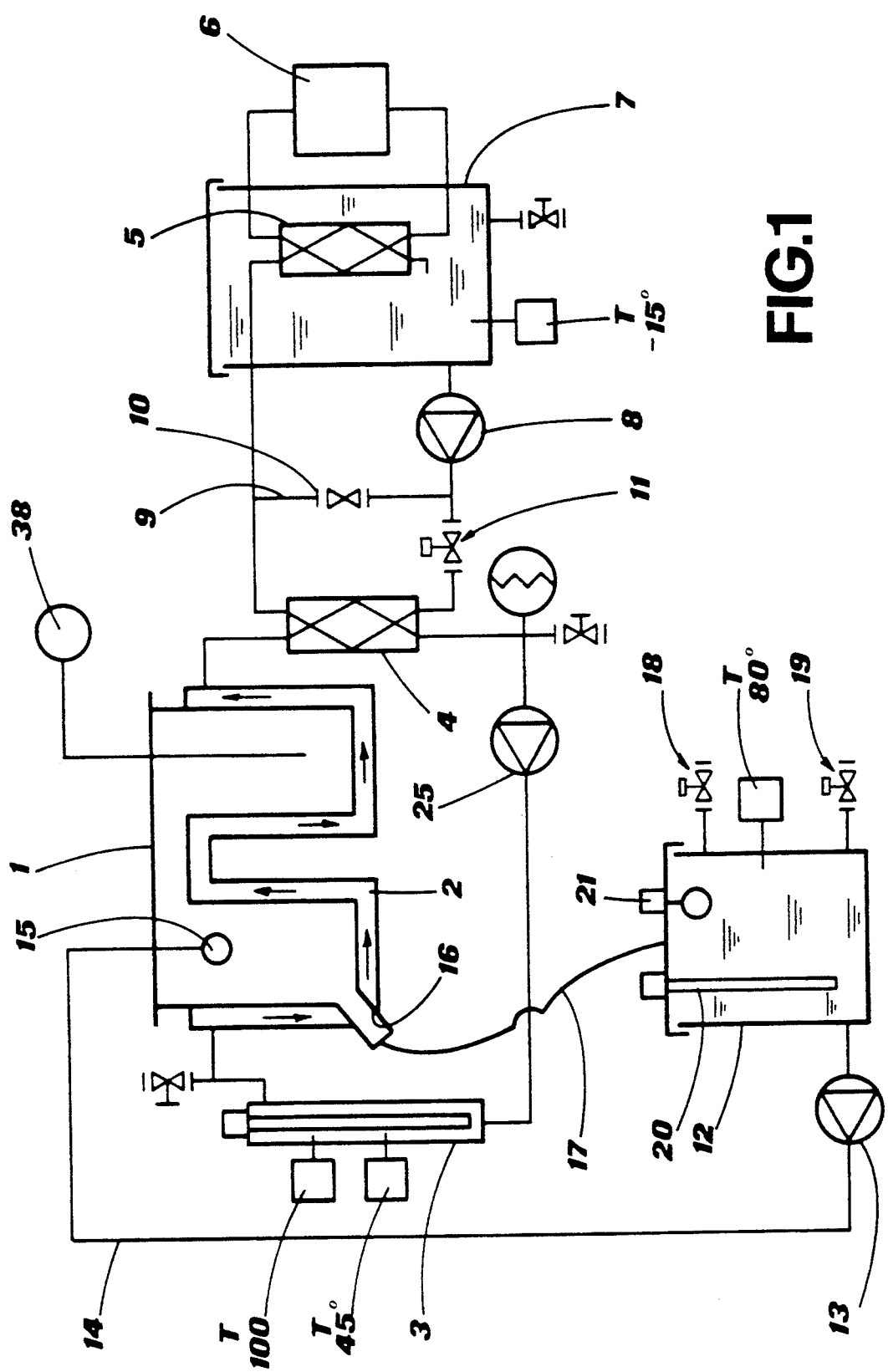
FIG. 1 is a diagram of the hydraulic and thermotechnical arrangement of the apparatus.
Figure 3:
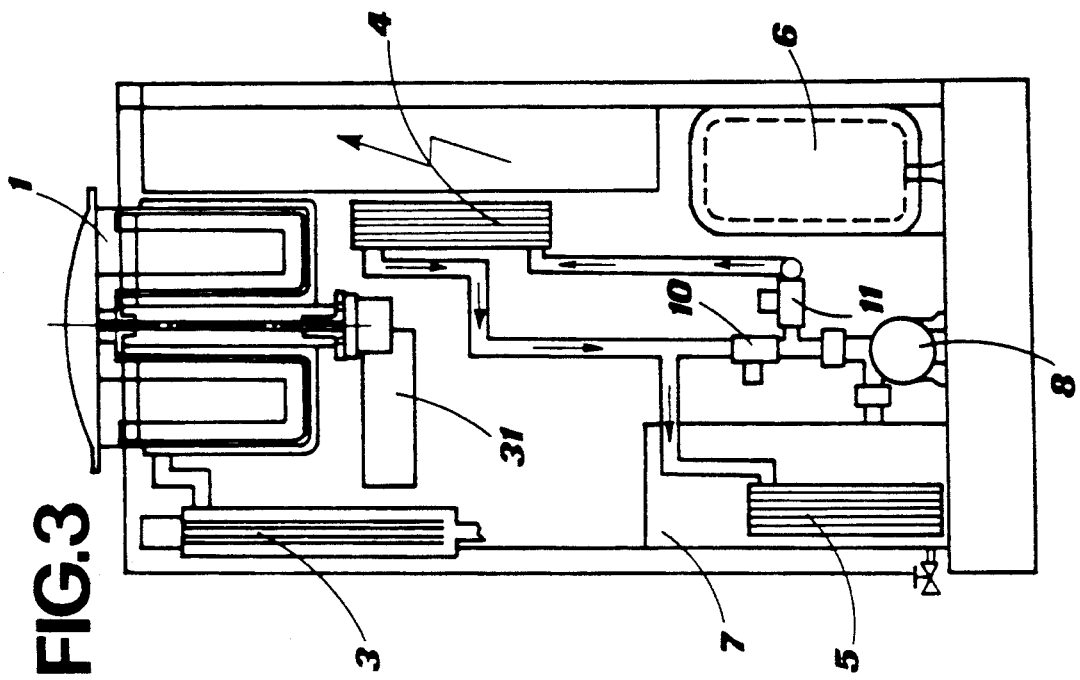
FIG. 3 is a frontal view of the apparatus, with a view of the devices arranged in the posterior part, the anterior devices not being in view.

In FIG. 1 number 1 denotes a vat in which the yoghurt or like product destined for consumption is produced.

A first heat exchange circuit comprising a cover 2 surrounding the lateral wall and the bottom of the vat 1, a heat generator 3, a first heat-exchanger 4, a circulation pump 25, as well as the necessary connection pipes. A heat-exchange liquid circulates in the first heat-exchange circuit. This liquid can be constituted by, for example, a water and glycol mixture.

The first heat exchange circuit serves to regulate the temperature of the product inside the vat 1 in the various phases of pasteurization and homogenization, maturation and maintenance. The heat is provided by the heat generator 3, preferably constituted by an electrical resistance element commanded by thermostats, while the cooling is obtained by means of heat exchange on the part of the heat exchange liquid with a second circuit, known also as the refrigeration circuit.

The second circuit, or refrigeration circuit, comprises, apart from the first heat exchanger 4, a second heat exchanger 5, a refrigeration group 6, a diathermic liquid tank 7 and a circulation pump 8. The diathermic liquid, moved by the pump 8, circulates in heat exchange with the fluid of the refrigeration group 6 in order to be refrigerated to a constant temperature around −15 degrees C., and also in heat exchange with the heat exchange liquid of the first circuit in the first heat exchange, during the product maintenance phase in the vat 1 and during the cooling phase from the maturation temperature to the maintenance temperature. The liquid is, for example, water with glycol added to it.

When the heat exchange liquid in the first circuit is not to be refrigerated, the heat exchanger 4 is excluded from the refrigeration circuit by means of a by-pass conduit 9 equipped with an electric on-off valve 10. A second on-off valve 11 is arranged in the inlet conduit to the first heat exchanger 4. The alternating opening or closing of the on-off valves 10 and 11 produces, as is evident from the circuit shown in FIG. 1, the exclusion or inclusion of the heat exchanger 4 in or from the refrigeration circuit.

During the exclusion of the heat exchanger 4 from the refrigeration circuit, the refrigeration group 6 continues to be active to accumulate of glycol-water at a temperature of −15 degrees C.

The apparatus further comprises a cleaning circuit including a tub 12 of cleaning liquid, a circulation pump 13, a conduit 14 taking the cleaning water inside the vat 1 towards a spraying device 15, and an outlet 16 to drain the liquid from the inside of the tub 12. Preferably the tube 17 is applied manually at the moment of activation of the cleaning circuit. The tub 12 can be replenished with cleaning liquid from an external source by means of a solenoid valve 18 and can be drained towards the outside by action of another solenoid valve 19. A heating resistance element 20 provides heating for the cleaning water and a level reader 21 reads the levels in the cleaning tub.

Thus having described the thermohydraulic functioning diagram of the apparatus, in the following a preferred embodiment, shown in FIGS. from 2 to 4, will be described, in which a constructional solution for the apparatus is adopted. Worthy of note is the fact that the choice of solution, together with the choice and location of the thermohydraulic circuit devices, is of great importance in this type of apparatus, where the control of times and temperatures, as well as the control of the various operations to be performed, is extremely critical with respect to the final quality of the product.

The drawings of FIGS. from 2 to 4 are illustrative and show the inside of the apparatus from various points of view.

The apparatus is contained in a structure denoted in its entirety by 22, and is divided into an upper part and a lower part. The upper part substantially contains the first heat exchange circuit with the heat generator 3, the first heat exchanger 4, the circulation pump 25 and an expansion tube 24. The upper part also contains the vat 1, made in stainless steel, preferably cylindrical in shape with its bottom inclined towards the outlet 16. The mechanical structure of the vat 1 will be described in greater detail with reference to FIG. 5.

The lower part essentially comprises the second heat exchange circuit, the refrigeration group 6 as well as the circulation pump 8 and the cleaning tub 12.

With this arrangement, the devices dedicated to preserving a low temperature are in the lower part of the structure, while the devices undergoing a heating operation are concentrated in the upper part.

Figure 5:
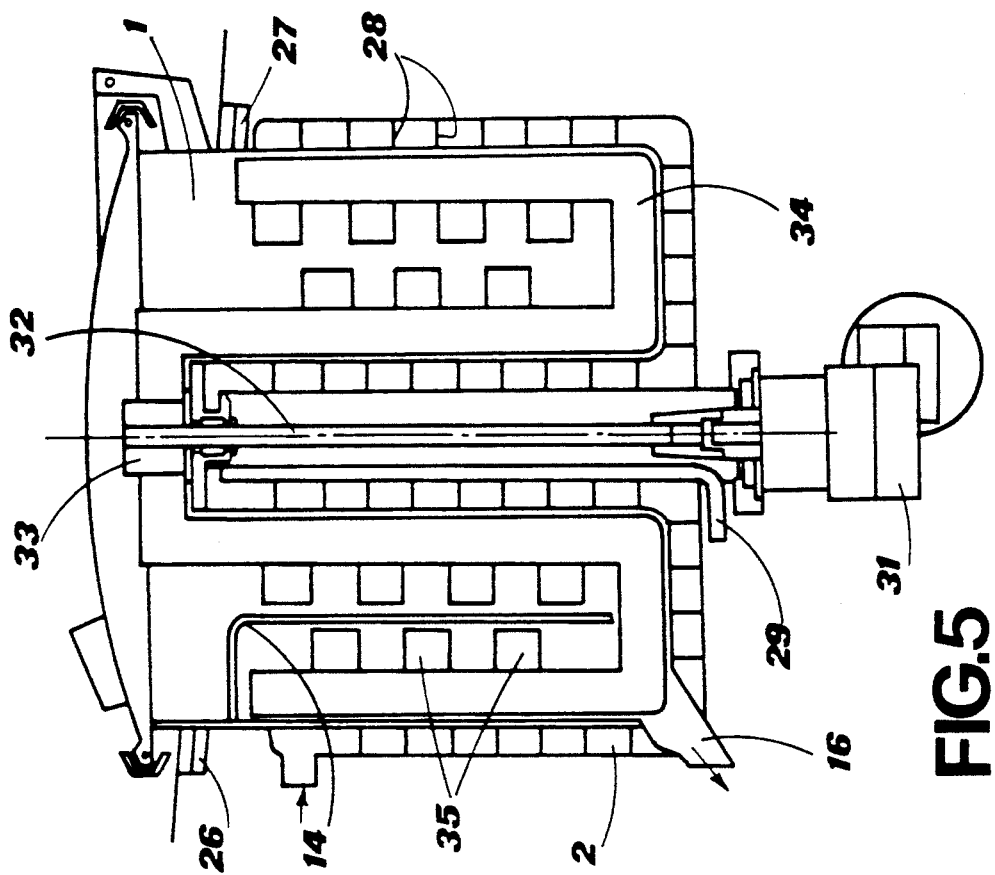
FIG. 5 is a schematic view of the vat and its accessories.
Figure 4:
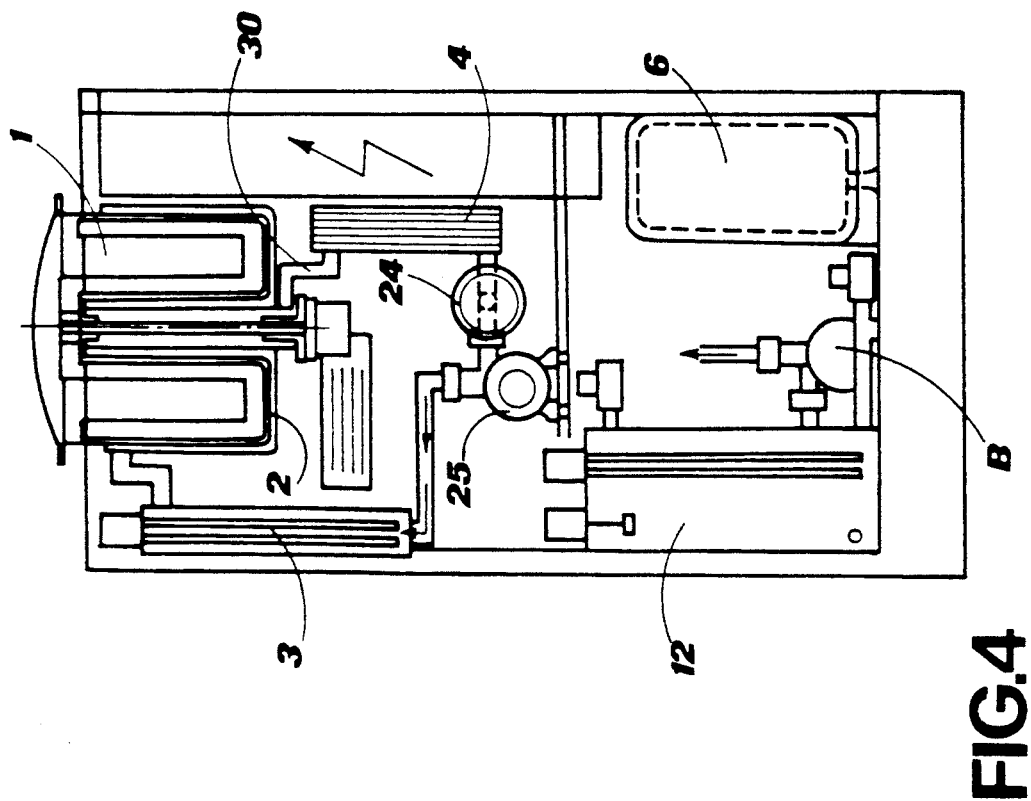
FIG. 4 is a frontal view of the apparatus, with the devices located in the anterior part in view, while those in the posterior part are not.

With reference to FIG. 5, the vat 1 is mounted by means of supports 26, 27 on the upper wall of the structure. The cover 2 surrounding the lateral wall and the bottom of the vat 1 internally exhibits a finning 28 having a double function of improving the efficiency of the heat exchange and controlling the flow of liquid sent by the circulation pump 25. A conduit 29 places the space of the cover 2 in communication with a tube 30 leading to the heat exchanger 4. A two-speed regulatable fixed motor-gear group 31, exhibits a drive shaft 32 passing internally to the vat 1 by means of a sealed rotatable coupling. An anchor 34 of a stirring device constituted by the said anchor 34 and the motor group 31 is mounted to the shaft 32 by means of a rapid-mounting pin 33. Helical fins 35 are mounted on the anchor 34 and have the functions of homogenising the product during the pasteurization phase, causing the breaking-up of the coagulated masses after the maturation phase and stirring the product during the maintenance phase.

During the culture phase, coagulation-breaking phase and product maintenance phase, the motor 31 and the stirring group will rotate slowly.

Figure 2:
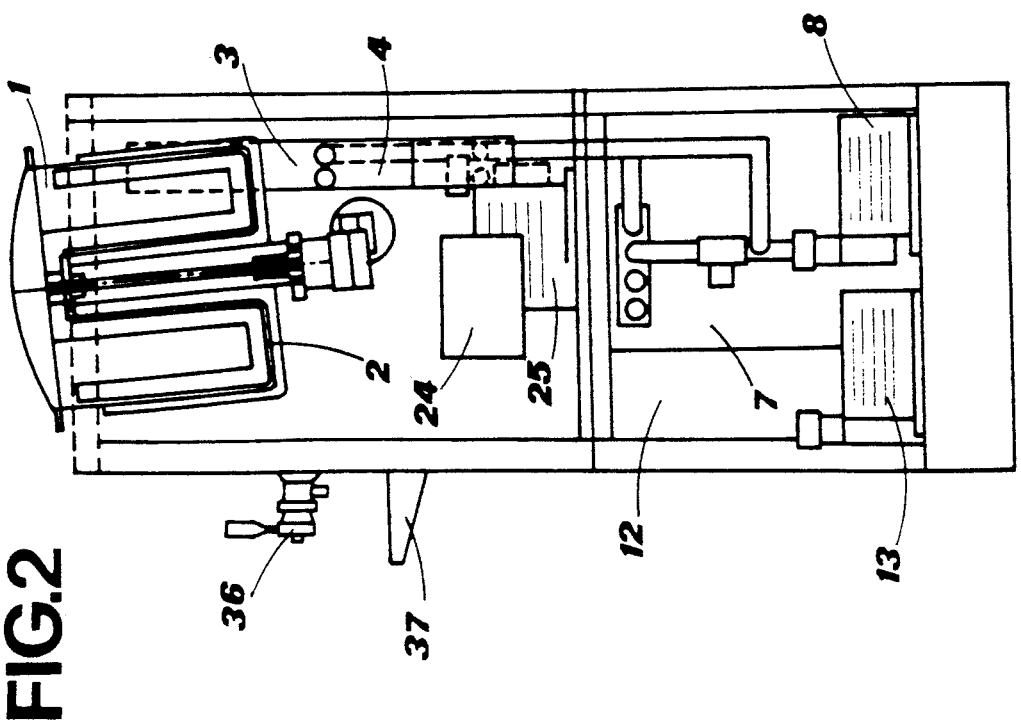
FIG. 2 is a lateral view of the apparatus, with the inside of the apparatus visible.

For the removal of the product, a conduit is provided which brings the product from the bottom of the vat 1 and takes it to a dispensing tap 36 (FIG. 2) by the effect of pressure imposed by the anchor 34 and by the hydrostatic head. A serving plane 37 for the placing of cups or glasses is located under the tap 36, which also serves to collect the spillings. A control system is provided for the command of the various preparation and maintenance phases, the said control system comprising a speed-variator of the stirring group motor, thermostat electric valves, all commanded by a programmed logical circuit. The complete preparation phase cycle is programmed by means of a programming handle. In the following the functioning of the apparatus will be briefly described. By means of the cleaning cycle the vat 1 is carefully cleaned, as are the stirring group and the dispensing group: then the milk, preferably in quantities of between 20 and 30 liters, is poured into the vat 1. Then the first pasteurization and homogenization phase commences, in which the stirring-motor group 31, 34 is activated by a PLC (programmed logical circuit) at a high number of revolutions, in practice between 40 and 100 revolutions per minute. In this first phase the heat generator 3 with its electrical heating elements also begins to function, to bring the temperature of the heat-exchange liquid and the milk to be pasteurized up to 92-95 degrees C., which temperature is maintained for about 25-30 minutes. At the end of this phase, the electrical resistance elements are turned of and the valves 10 and 11 of the second refrigeration circuit are activated to effect a first cooling down to a temperature of 43-45 degrees C. for a duration of 10-15 minutes. Then follows the most important phase of the cycle, that is the insemination of the milk with the bacterial flora (culture phase). This phase is effected manually and, also manually or alternatively by means of the PLC, the stirring group is inserted, and made to stir at a low speed, typically 10-20 revolutions per minute. At this point the stirring group is removed and the third phase of maturation is proceeded to, for which phase the temperature will be kept constantly around 42-45 degrees C. by means of insertion or removal of the heating group under the command of a thermostat 38 placed internally to the vat 1. The maturation phase can be programmed for a period comprised between 6 and 7 hours according to the density and consistency desired in the finished product. In the fourth and last maintenance phase, the refrigeration group 6 by means of the refrigeration circuit brings the temperature of the product down to 4-5 degrees C. and keeps it constantly at that temperature up until the product has been fully dispensed. According to the present invention, the volume of the vat 1 is such that the whole product will be dispensed within a day, so that the product is always guaranteed fresh.

What is claimed:

1. An apparatus for preparing and distributing fermented dairy products comprising:
   a vat having a lateral wall and a bottom for pasteurizing, maturing and maintaining a product;
   a cover adjacent to said lateral wall and to said bottom for controlling the temperature of the product present in the vat;
   a first heat-exchange circuit defined by said cover and by said vat, a heat-exchange fluid circulating in said first heat-exchange circuit, said first heat-exchange circuit including a heat generator for the heating of said heat-exchange fluid and including a first heat exchanger for the cooling of said heat-exchange fluid;
   a second heat-exchange circuit having a tank, a diathermic liquid circulates in the second heat-exchange circuit, a second heat-exchanger being disposed in said tank, and a refrigeration group connected, in a heat-exchange relationship, to the second heat-exchanger; said second heat-exchange circuit being connected to said first heat-exchanger by a by-pass conduit parallel to the first heat-exchanger, a first on-off valve being connected to the by-pass conduit and having a second on-off valve connected to an inlet of the first heat-exchanger to selectively control the flow of diathermic liquid passing from the second refrigeration circuit;
   a cleaning circuit having a cleaning water tub, an inlet, and an outlet communicating respectively with a cleaning water source and a discharge drain, a first conduit placing the washing tub in communication with the inside of the vat, and a second conduit connecting the discharge outlet of the vat to the tub; and
   an electronic control system for programming and commanding the preparation and distribution of said product.

2. An apparatus as in claim 1, wherein said first heat-exchange fluid is a water and glycol mixture.

3. An apparatus as in claim 1, wherein said second heat-exchange liquid is a water glycol mixture.

4. An apparatus in claim 1, wherein said vat comprises a stirring group having a shaft which rotates at predetermined regulated speeds, said shaft passing inside of said vat and said shaft being driven by an electric motor, said stirring group further comprising an anchor, a plurality of helical fins being fixed to said anchor for homogenizing the product in a pasteurization phase and to maintain the product in a homogeneous state during a maintenance phase.

5. An apparatus as in claim 4, wherein said anchor is fixed to said shaft by a pin.

6. An apparatus as in claim 5, wherein a tap for dispensing the product is connected directly to the vat bottom.

7. An apparatus as in claim 6, wherein said cover includes a helical finning to improve the heat exchange and to regulate the flow of heat exchange fluid.

8. An apparatus as in claim 7, wherein the apparatus is contained in a structure that is divided into a superior part and an inferior part; said superior part including said vat, said stirring group, said first heat-exchange circuit, said first heat-exchanger and a circulation pump for said diathermic liquid tank, said second heat-exchanger, a circulation pump for said heat-exchanger liquid and the refrigeration group, the cleaning water tub and a cleaning water pump for the cleaning water.

9. An apparatus as in claim 1, wherein said control system comprises a programmed logical circuit, a speed change gear of the stirring group motor, at least one thermostat sensitive to the temperature of the product in the vat and the heat exchange circuits, and said apparatus further comprising solenoid valves to open and close fluid communication of said diathermic liquid with said second heat-exchanger.

10. An apparatus as in claim 2, wherein said second heat-exchange liquid is a water and glycol mixture.

* * * * *

UNITED STATES PATENT AND TRADEMARK OFFICE
CERTIFICATE OF CORRECTION

PATENT NO. : 5,327,818
DATED : July 12, 1994
INVENTOR(S) : Maurizio OLIVETTI

It is certified that error appears in the above-indentified patent and that said Letters Patent is hereby corrected as shown below:

Title page, item: [54], change "DIARY" to --DAIRY--.

Col. 1, line 3, change "DIARY" to --DAIRY--.

On the title page, item [73] Assignee, should read --LIFE SAVER s.r. l., Rome, Italy--.

Signed and Sealed this

Third Day of January, 1995

Attest:

BRUCE LEHMAN

*Attesting Officer*  *Commissioner of Patents and Trademarks*